Jan. 8, 1952     H. S. CAMPBELL     2,581,923
AUXILIARY ROTOR FOR HELICOPTERS

Filed Nov. 25, 1947

INVENTOR
Harris S. Campbell
BY
ATTORNEYS

Patented Jan. 8, 1952

2,581,923

UNITED STATES PATENT OFFICE 2,581,923

AUXILIARY ROTOR FOR HELICOPTERS

Harris S. Campbell, Bryn Athyn, Pa., assignor to The Firestone Tire & Rubber Company, Akron, Ohio, a corporation of Ohio Application November 25, 1947, Serial No. 787,904

8 Claims. (Cl. 244—17.19)

1

This invention relates to helicopter type aircraft and is more particularly concerned with the construction and installation of tail rotors used in aircraft of this nature for directional control including torque control.

In helicopters having a single main sustaining rotor a convenient method for counteracting the torque developed in driving the sustaining rotor and for directional control of the aircraft generally, is to provide a small mechanically driven rotor unit mounted at the rear end of the aircraft. The axis of the directional rotor is mounted in a transverse direction. One of the main objects of the present invention is to provide an improved construction for such tail rotors, including the structural arrangement, drive mechanism and control.

In a tail rotor construction suitable for use in the directional control of a helicopter it is necessary to provide for pitch control of the rotor blades through a considerable range in order to produce the variation in thrust required for normal control and torque counteraction purposes. The range of pitch is normally from a small negative pitch of the rotor blades to a large positive pitch of the rotor blades so that complete control may be obtained in either the autorotational condition of operation when no power is applied to the main rotor, or in the full powered condition of the main rotor when maximum torque reaction is developed. During autorotational operation little or no tail rotor force is required for correction of torque so that the tail rotor pitch may vary from a small positive to a small negative value in order to give a force for directional control to either left or right. When power is applied to the rotor a positive average pitch setting of the tail rotor blades is needed to produce the thrust required for counteracting the main rotor torque. The tail rotor blade pitch is increased or decreased slightly from this average pitch setting in order to change the lateral tail force the required amount for directional control purposes. Actuation of the pitch control is normally accomplished by connecting to the rudder pedals.

It is an object of the present invention to provide improved mechanism for actuating the pitch control of the tail rotor blades, which mechanism is constructed to give positive and accurate control while preventing the development of vibration in the control system and structure of the aircraft.

2

It is a specific object of the invention to provide tail rotor pitch control mechanism having parts so disposed that they provide a compact unified assembly which has the various control parts located in a particularly advantageous position to permit easy connection for the rudder controls while maintaining such control connections within the confines of the aircraft structure and tail rotor fairing so as to completely enclose the controls.

It is a further specific object of the invention to provide tail rotor pitch mechanism having improved compact means for transferring control motions from cable members to a pitch rod acting at right angles to the cable members and including a rotational connection.

Another object of this invention is to provide a unified tail rotor assembly with means for quickly attaching or detaching the unit from the aircraft structure, including mechanism for quickly disconnecting the drive to the rotor unit.

It is a further object to provide a tail rotor construction having simplified removable housing sections to provide for easy assembly or disassembly of the driving and pitch control mechanism.

How the above and other objects and advantages of this invention are accomplished will be clear from the following description of the drawing in which—

Figure 1:
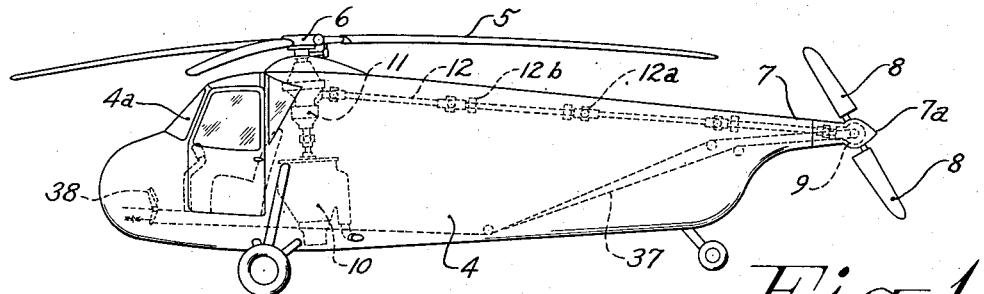
Figure 1 is a side elevational view of an aircraft incorporating a tail rotor having features of the present invention.

In Figure 1 a helicopter aircraft is shown having a fuselage 4 containing an occupants' compartment 4a. A main rotor having blades 5 attached to hub member 6 is illustrated attached to the fuselage 4 just aft of the occupants' compartment 4a. At the rear end of the fuselage 4 a structural extension 7 is provide to support an auxiliary tail rotor unit having blades 8 and a hub unit 9 on which the blades 8 are supported for rotational operation.

Power is supplied by an engine 10 located below the main rotor and connected to it by means of a transmission 11 which incorporates suitable clutch mechanism and reduction gearing to drive the rotor blades 5 at an efficient speed. In transmission 11 there is also incorporated gearing to provide a drive for the tail rotor drive shaft 12. The tail rotor drive is arranged to be connected with the main rotor at all times so that even during autorotational operation the tail rotor is driven at a suitable speed to provide for directional control of the aircraft. To provide flexibility for motions of the fuselage and to allow misalignment in the driveshaft mounting, universal joints 12a are used in the shaft 12. Mounting bearings 12b support the shaft in the fuselage 4.

Figure 2:
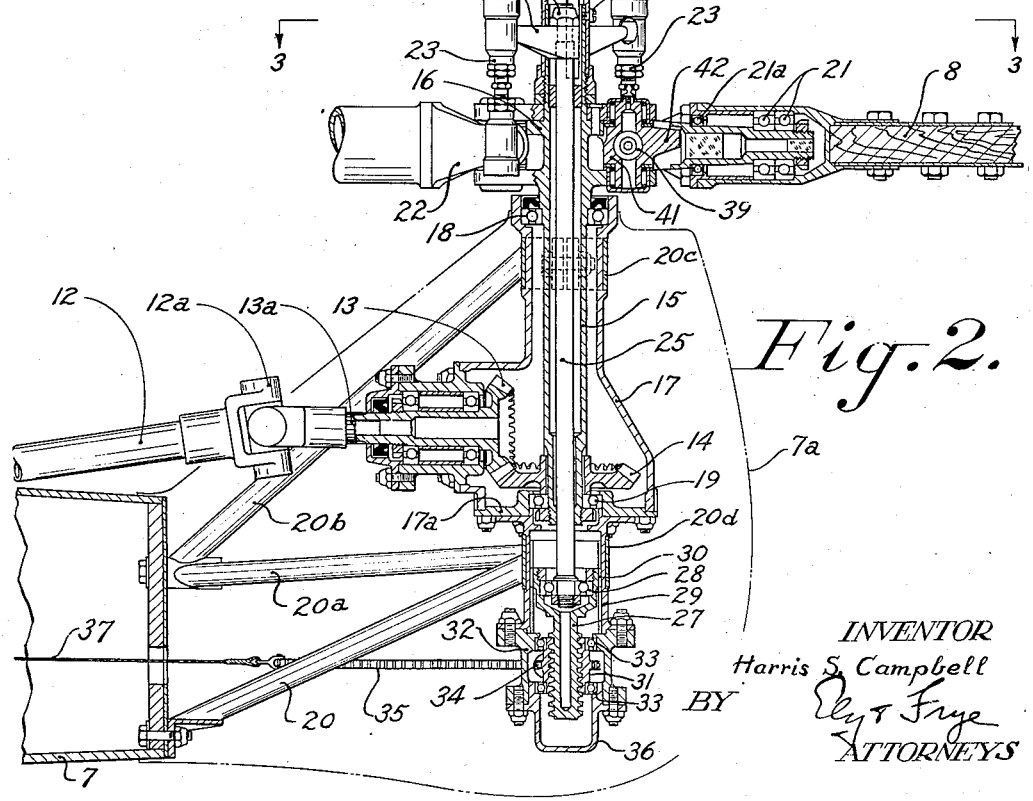
Figure 2 shows a sectional plan view of the tail rotor mechanism and mounting to an enlarged scale.

Referring now to Figure 2, it will be observed that the drive shaft 12 is connected with a pinion gear 13 by means of a sliding spline connection 13a. pinion gear 13 is meshed with gear 14, the latter being connected to the axle 15 of the tail rotor. The axle 15 extends to form part of the hub 16 to which the blades 8 are attached. If desired, the blades 8 may be connected to the hub 16 by means of suitable pivots to reduce the bending moments in the blades.

The axle unit consisting of axle 15 and hub 16 is supported in the housing 17 by means of bearings 18 and 19. A support which may be in the form of a framework composed of tubes 20, 20a and 20b may be provided to attach the tail rotor unit to the rear end of the fuselage extension 7. Tube 20 is a single tube in the plane of the unit while tubes 20a and 20b are angled to attach to the fuselage extension 7 below the mid-plane. Corresponding tubes to 20a and 20b (not shown) are angled upwardly to attach above the mid-plane and complete the structure. It will be noted that this tubular frame structure is bolted to the fuselage and connected to the rotor unit by means of clamp fittings 20c and 20d, each of which are fastened to the unit by two bolts as indicated in dotted outline at clamp fitting 20c.

With this construction the tail rotor unit may be mounted in the most advantageous location without the need for special shaping of the fuselage extension. As illustrated, the drive shaft 12 emerges from the side of the fuselage extension 7 near the rear. The hub unit is positioned to give the proper clearance between the blades and the fuselage.

Figure 3:
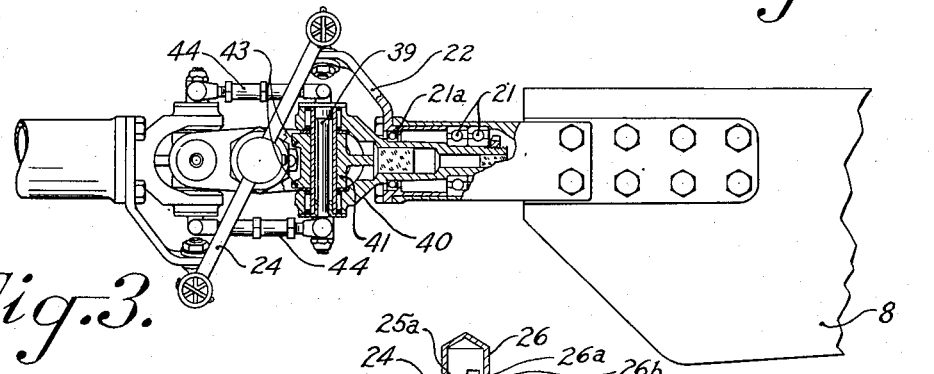
Figure 3 is an elevational view of the rotor unit taken generally along line 3—3, Figure 2, with certain parts shown in section.

Each rotor blade 8 is mounted as illustrated on bearings 21 and 21a to provide for pitch change, the bearings serving to retain the blades against centrifugal and other forces. An arm 22, which is more clearly seen in Figure 3, is attached to the blade to transmit the pitch change motion thereto. A push rod 23 having a ball-end joint at each end connects each arm 22 to the end of beam 24 which is located outboard of the hub 16. Beam 24 is attached to the end of the rod 25 and is guided in cylindrical member 26 which allows axial motion along the slot 26a but prevents rotational movement of beam 24 with respect to hub 16. It will be noted that cylindrical member 26 is supported on an extension of axle 15 by means of set screws as indicated at 26b, there being slots in the axle extension to register with slots 26b.

Rod 25 extends completely through axle member 15 and is connected to another member 27 through the medium of a thrust bearing 28. Rod member 27 is prevented from rotational movement with respect to its housing 29 by means of spline-like projections 30. The rod 25 thus rotates with the axle 15 while axial movements may be transmitted to it from the member 27 through the bearing 28. Member 27 is provided with a worm thread which is adapted to fit into a cooperating female threaded part 31. Part 31 is supported in a housing 32 by means of bearings 33 and is also provided with sprocket teeth 34 on its external surface so that the barrel part 31 may be rotated by moving the chain 35 which is arranged to engage the sprocket 34. A cover member 36 encloses the end of the worm operating mechanism. Chain 35 passes through holes in housing 32 and the ends are attached to cables 37 which are connected to the rudder pedals. The rudder pedals are shown in Figure 1 by numeral 38. The location of the sprocket unit is directly behind the fuselage extension 7. Thus with the sheet metal fairing cover 7a in position, the cables and chain are completely enclosed. The moving control parts are protected in this fashion from the danger of jamming due to foreign material, such as dirt, paper or rags, blowing into the mechanism. At the same time the appearance and aerodynamic characteristics of the tail rotor are improved.

It will be observed from Figure 2 that disassembly of the pitch control actuating mechanism may be easily accomplished after removal of the unit from the craft. This is done by removing cylindrical cap 26 and nut 25a after which rod 25 may be removed with the remainder of the pitch mechanism without disturbing the axle and drive parts. The pitch mechanism housing is disassembled from the main housing by removing the bolts which hold the flange of housing 29 to the end plate 17a of housing 17.

The mounting of the blades to the rotor hub in the example shown in the present application utilizes a horizontal pivot member as illustrated at 39 in Figure 3. The blade fork 40 is connected by the pivot 39. The horizontal or flapping pivot 39 passes through a block part 41 having trunnion projections which are pivotally supported in suitable needle bearings mounted in the rotor hub. A stop member 42 restricts the angle of flapping motion which the blade may make about the flapping pivot 39. Similarly, stops 43 restrict the motion about the drag pivot in either the leading or lagging sense. In order to provide that the two blades of the tail rotor shall remain in proper pattern a pair of drag links 44—44 are pivotally connected to the ends of the flapping pivots. This provides a parallel linkage construction which assures that the two blades always make equal angles with respect to the hub member. This does not restrict the motion of the blades on the flapping pivots in any manner.

The operation of the pitch control mechanism is such that the blade pitch is changed upon motion of the rudder pedals. In the aircraft as illustrated, in order to produce a turn to the left the left rudder pedal is moved forwardly causing an increase in pitch in the tail rotor blades. This is accomplished through the medium of cable 37 and chain 35 which rotates the barrel member 31. Barrel member 31 is fixed against axial motion in the housing. Therefore, member 27 is moved axially in a direction away from barrel member 31. This in turn causes axial movement of rotating push rod 15 with the result that the ends of the blade arms 22 are lifted causing an increase in pitch of each of the blades 8. The range of blade pitch motion allows operation from a slight negative pitch in order to give control in either direction when no torque is applied to the main rotor, to a high positive pitch such that a sufficient constant pitch may be maintained to correct maximum torque application with a small additional amount of pitch available for directional control purposes. The worm thread and mounting of the parts rigidly in the housing provides a mechanism which prevents the development of undesired blade pitch movements such as might cause periodic vibration in the control system which in turn would be transmitted to the aircraft structure.

By the construction above described it will be seen that I have provided a compact and effective tail rotor unit for helicopters. By offsetting the driving gears from the center of the aircraft, the controls may be arranged to be completely enclosed. The use of a chain and sprocket to transmit the control motions from the control cables to the internal mechanism provides a compact and positive acting transfer medium. The arrangement for mounting the rotor unit which by means of simple fittings on a separate structure from the fuselage proper provides a versatile arrangement which allows disassembly in different fashions for service or repair. The arrangement of housings to provide separate chambers for the gearing and axle, the rotational connection and the sprocket unit also facilitates assembly and disassembly. The method of retaining the outer end of the control members in proper position by means of slots in an extension of the axle provides a simple and positive construction. With this arrangement of parts the pitch control action is effected through a minimum of robust parts resulting in a reliable and accurate operating control mechanism.

I claim:

1. For a helicopter, a directional tail rotor construction having a plurality of rotor blades, an axle on which said blades are supported, pitch control mechanism for said blades including a push rod rotatable with said axle, a rod in axial alignment with said push rod and connected thereto by means of a bearing, said second rod being restrained against rotation and having a male thread thereon, a barrel part having complementary female threads adapted to fit around said stationary rod, a housing in which said barrel part is mounted for rotation, sprocket teeth attached to said barrel part, a chain adapted to engage said teeth for causing rotation thereof.

2. Helicopter tail rotor mechanism including a rotatable axle member mounted in a housing, rotor blades attached to said axle member, pitch control mechanism for said blades including a push rod axially movable inside of said axle, one end of said push rod extending beyond said axle at the end opposite said blades, a threaded non-rotating rod part, a bearing connecting said push rod to said non-rotating rod part, said non-rotating rod part being enclosed in a housing and having projections engaging said housing to prevent rotational motions with respect thereto, a barrel part having chain sprocket teeth around its outside surface and having a complementary thread at its inner surface adapted to engage said threaded non-rotating rod part, said barrel part being mounted for rotational movement but being restrained against axial movement.

3. For a helicopter, a tail rotor construction including a rotatable axle member mounted in a housing and having rotor blades attached thereto, pitch control mechanism for said blades including a push rod rotatable with said axle and movable axially with respect thereto, said push rod having one end extending beyond the end of said axle opposite said blades, a non-rotating rod part having a fast acting thread, a bearing connecting said push rod to said non-rotating rod part, said non-rotating rod part having means for engaging a housing part to prevent rotation, a barrel part having a thread adapted to engage the threaded portion of said non-rotating rod part, said barrel part being mounted for rotation but being restrained against axial movements and being further provided with integral sprocket teeth at its outer surface.

4. A tail rotor construction for a helicopter having an axle member supported in a housing, bevel gearing for driving said axle member also supported in said housing, mechanism for controlling the pitch of the tail rotor blades including a push rod located inside said axle member and movable with respect thereto, a non-rotatable threaded rod adapted to move said control rod axially, sprocket means supported in a separate housing and having a complementary thread engaging said threaded rod.

5. A tail rotor construction for a helicopter having an axle member supported in a housing, bevel gearing for driving said axle member also supported in said housing, pitch control mechanism for the rotor blades including a push rod located inside said axle member and movable with respect thereto, a non-rotatable threaded rod having a bearing connecting it to said push rod, a cylindrical housing separate from the main axle housing and having means engaging said non-rotatable rod part to prevent rotation thereof, a third housing arranged for attachment to said second housing and adapted to support a sprocket part for rotational movements therewith, said sprocket part having a thread adapted to engage the thread on said rod part whereby rotation of said sprocket produces axial movement of said rod.

6. A tail rotor unit for helicopters having a main housing, an axle member mounted in said housing, rotor blades attached to said axle member, drive gearing for transmitting power to said axle, said gearing being mounted in said housing, blade pitch control mechanism including a rotatable push rod, a non-rotatable rod part, a rotatable member having threaded engagement with said non-rotatable rod part, means for attachment of the tail rotor unit to the fuselage structure including a pair of quick detachable brackets, a drive shaft, means for connecting said drive shaft to said gearing, said last mentioned means being easily disconnected.

7. For a helicopter, a tail rotor construction including a rotatable axle member, housing means in which said axle member is supported, a rotor blade attached to said axle member, pitch control mechanism for said blade including a push rod rotatable with said axle, a non-rotatable rod, a thrust bearing interconnecting said rods, means attached to said non-rotatable rod for preventing rotation thereof, means for transmitting an axial movement to said non-rotatable rod including a cylindrical part supported for rotation in said housing means.

8. A helicopter having an elongated fuselage structure symmetrical about a vertical longitudinal plane and terminating in a generally vertical bulkhead, a tail rotor unit located with its thrust axis transverse to said fuselage structure and supported by an unsymmetrical bracket structure mounted on said bulkhead, said rotor unit comprising a rotor shaft, a drive shaft extending from the side of said fuselage and arranged at an acute angle thereto, co-acting means on said rotor shaft and drive shaft for imparting rotation to said rotor shaft and located in spaced relation to said fuselage laterally thereof, rotary pitch control means detachably connected to said rotor unit, arranged co-axially with said rotor shaft and substantially aligned with the longitudinal axis of said fuselage, and control means passing through said bulkhead and operatively connected with said pitch control means.

HARRIS S. CAMPBELL.

REFERENCES CITED

The following references are of record in the file of this patent:

UNITED STATES PATENTS

| Number | Name | Date |
|---|---|---|
| 1,386,274 | Parker | Aug. 2, 1921 |
| 1,622,138 | Ellerman | Mar. 22, 1927 |
| 2,058,161 | Lewis et al. | Oct. 20, 1936 |
| 2,318,259 | Sikorsky | May 4, 1943 |
| 2,318,260 | Sikorsky | May 4, 1943 |
| 2,420,764 | Zuck | May 20, 1947 |
| 2,422,441 | Sights | June 17, 1947 |
| 2,427,936 | Walls | Sept. 23, 1947 |
| 2,473,299 | Pitcairn | June 14, 1949 |